E. SCHNEIDER.
GUN FOR ACCOMPANYING ATTACKING TROOPS.
APPLICATION FILED OCT. 24, 1919.

1,346,561.

Patented July 13, 1920.
15 SHEETS—SHEET 1.

E. SCHNEIDER.
GUN FOR ACCOMPANYING ATTACKING TROOPS.
APPLICATION FILED OCT. 24, 1919.

1,346,561.

Patented July 13, 1920.

Inventor:—
Eugène Schneider
By Munn, Cameron, Lewis & Markam
Attorneys

E. SCHNEIDER.
GUN FOR ACCOMPANYING ATTACKING TROOPS.
APPLICATION FILED OCT. 24, 1919.

1,346,561.

Patented July 13, 1920.
15 SHEETS—SHEET 4.

E. SCHNEIDER.
GUN FOR ACCOMPANYING ATTACKING TROOPS.
APPLICATION FILED OCT. 24, 1919.

1,346,561.  Patented July 13, 1920.
15 SHEETS—SHEET 5.

E. SCHNEIDER.
GUN FOR ACCOMPANYING ATTACKING TROOPS.
APPLICATION FILED OCT. 24, 1919.

1,346,561. Patented July 13, 1920.
15 SHEETS—SHEET 6.

E. SCHNEIDER.
GUN FOR ACCOMPANYING ATTACKING TROOPS.
APPLICATION FILED OCT. 24, 1919.

1,346,561.

Patented July 13, 1920.
15 SHEETS—SHEET 7.

E. SCHNEIDER.
GUN FOR ACCOMPANYING ATTACKING TROOPS.
APPLICATION FILED OCT. 24, 1919.

1,346,561.

Patented July 13, 1920.
15 SHEETS—SHEET 9.

E. SCHNEIDER.
GUN FOR ACCOMPANYING ATTACKING TROOPS.
APPLICATION FILED OCT. 24, 1919.

1,346,561. Patented July 13, 1920.
15 SHEETS—SHEET 11.

Inventor:—
Eugene Schneider
By Mauro, Cameron, Lewis & Kerken
Attorneys.

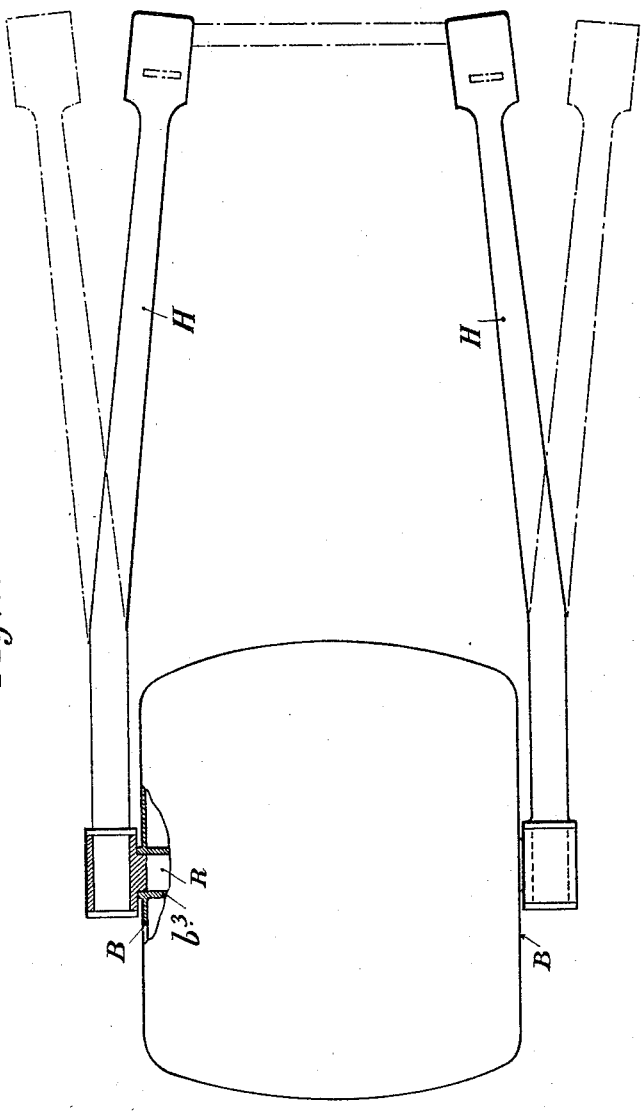

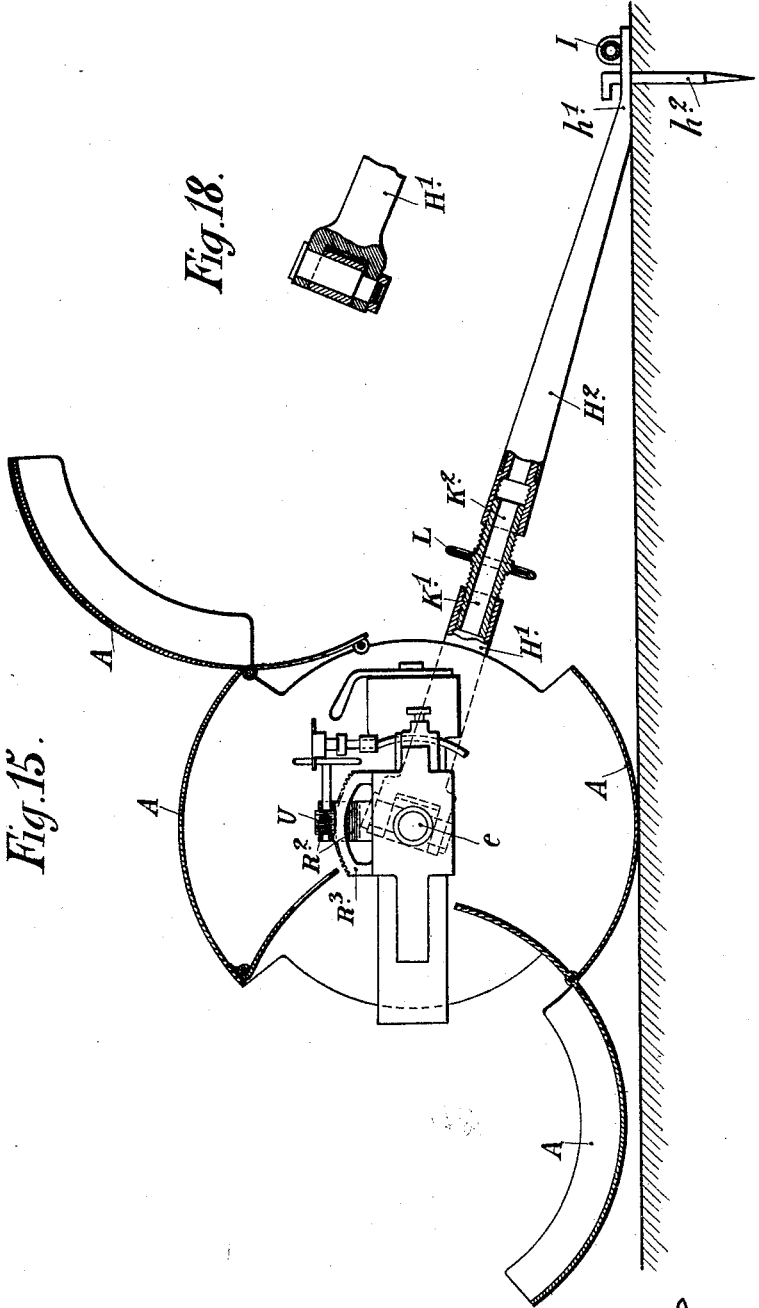

E. SCHNEIDER.
GUN FOR ACCOMPANYING ATTACKING TROOPS.
APPLICATION FILED OCT. 24, 1919.

1,346,561.

Patented July 13, 1920.
15 SHEETS—SHEET 14.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

GUN FOR ACCOMPANYING ATTACKING TROOPS.

1,346,561.  Specification of Letters Patent.  Patented July 13, 1920.

Application filed October 24, 1919. Serial No. 333,103.

*To all whom it may concern:*

Be it known that I, EUGÈNE SCHNEIDER, citizen of the Republic of France, a resident of Paris, in the Republic of France, have invented a new and useful Improved Gun for Accompanying Attacking Troops, which invention is fully set forth in the following specification.

This invention has for its object to provide an improved gun which is more particularly designed for accompanying attacking troops.

The improved gun is characterized by the feature that the gun carriage proper or gun carriage support is so constructed or arranged as to constitute for transport a kind of barrel surrounding the whole gun and adapted to roll over the ground around its longitudinal axis. The rolling movement may be effected by animal or other traction, or by man power, or by pushing, by means of fixed or removable shafts; these shafts being constructed in such a manner as to be capable of serving as trails for firing the gun.

The construction of the gun carriage or gun carriage support in the form of a barrel surrounding the gun proper, facilitates considerably the equilibrium of the whole combination in its rolling movement over very rough ground. It also allows of getting out the gun rapidly into battery position upon three points of support constituted respectively by the points of contact of the barrel-shaped carriage and of the two anchorages of the gun trails.

Various constructional forms of this invention are illustrated by way of example in the accompanying drawings in which Figures 1 to 4 illustrate a first constructional form of the invention.

Fig. 5 is a side elevational view of the gun in battery position.

Fig. 6 is a front elevational view of the same.

Fig. 7 is a plan view of the same showing the gun in position for transport.

Fig. 8 is a side elevational view.

Fig. 9 is a plan view and

Fig. 10 is a view partly in rear elevation and partly in vertical section showing the gun in battery position.

Figs. 11, 12 and 13 illustrate a fourth constructional form of the invention in which—

Fig. 11 is a side elevational view of the gun carriage in the battery position of the gun.

Fig. 12 is a rear elevational view partly in section and

Fig. 13 is a plan view partly in section showing in full lines the shaft-like trails in position for transport and in broken lines the same trails in battery position of the gun.

Figs. 15, 16, 17 and 18 illustrate a sixth constructional form in which—

Fig. 15 is a vertical longitudinal sectional view showing the gun in battery position.

Fig. 16 is a view partly in plan and partly in horizontal longitudinal section.

Fig. 17 is a rear elevational view partly in section in the line XVII—XVII of Fig. 16, and Fig. 18 is a detail view.

As shown in these figures, the gun is lodged entirely in a casing-shaped mount A of steel plate for instance. This mount has the shape of a barrel, that is to say its surface may be considered as being generated by the revolution of a curved generating line around an axis. This surface is closed by two ends B, B¹.

Figure 1:
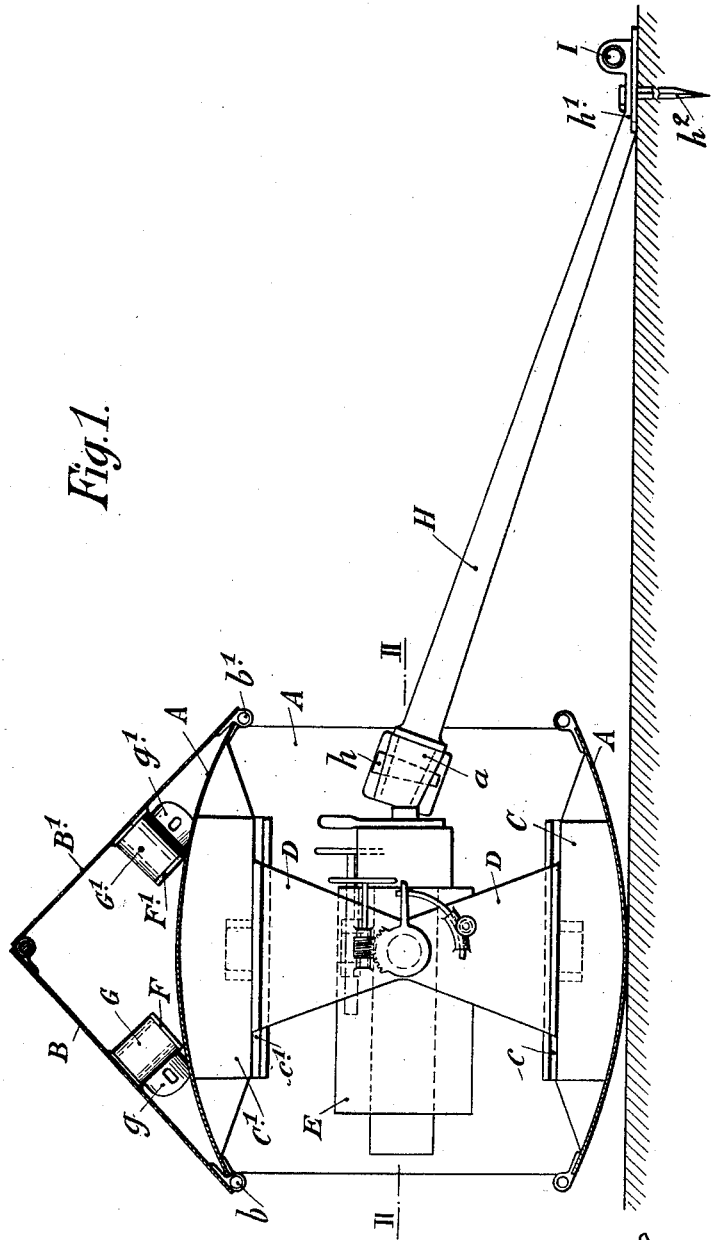
Fig. 1 is a side elevation partly in section on the line I—I of Fig. 2, showing the gun carriage in battery position.

In this first constructional form, the said ends are pivoted to the wall of the casing A by hinges $b$, $b^1$ respectively, and are capable of being raised and kept raised for firing as shown in Fig. 1, whereas for transport, they are fastened down or locked in such a manner as to constitute themselves actual ends for the casing-mount A.

The bearing of the gun upon the casing

A, during rolling and during firing, is in this first example produced as follows:

The casing A carries internally in two diametrically opposite planes at right angles to a longitudinal axial plane, two platforms C, C¹ upon which there is engaged in circular guides c, c¹ a small gun mount comprising two stay plates D in the bearing d of which the gun barrel E is journaled.

The barrel-shaped casing A—B—B¹ is provided externally in the axis of its ends, with two trunnions F, F¹. On each of these trunnions there is mounted loose a collar G, G¹ provided with a truncated conical socket g, g¹ into which there can be engaged corresponding ends of the shafts or trails H for transport purpose. These trails, which are suitably cranked or bent, are, for transport, engaged in the sockets, g, g¹ and fixed by means of keys h in a position in which their rear portions converge toward each other.

Figure 2:
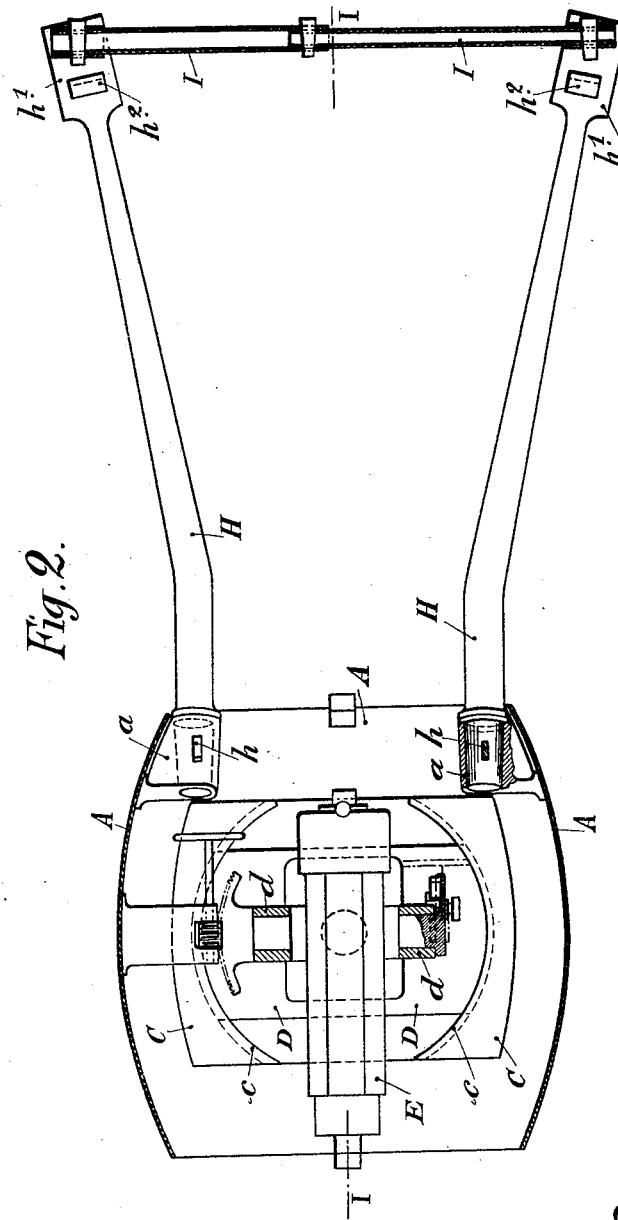
Fig. 2 is a corresponding plan partly in horizontal section on the line II—II of Fig. 1.
Figure 3:
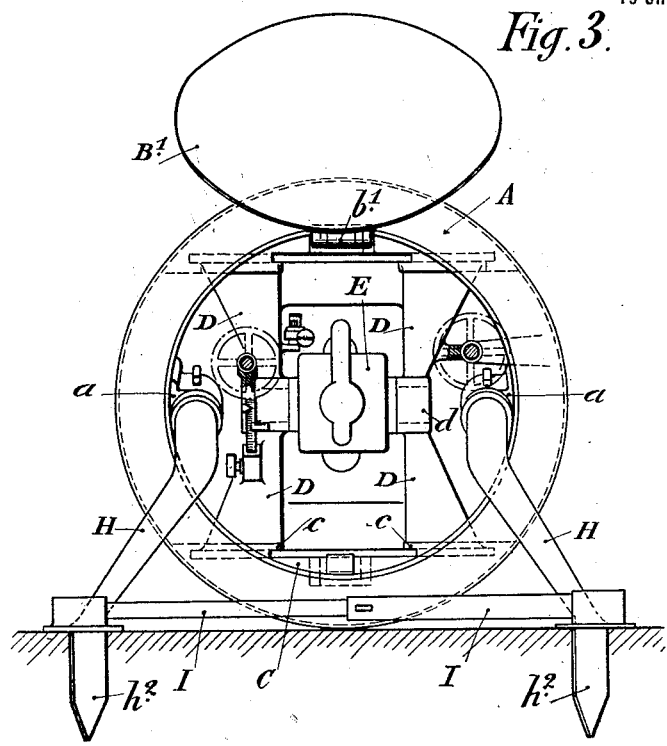
Fig. 3 is a corresponding breech and elevation.
Figure 4:
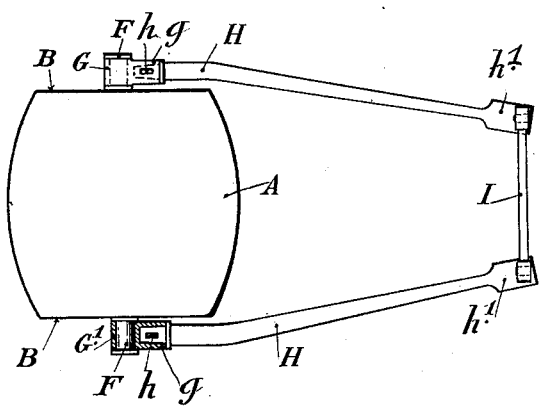
Fig. 4 is a plan on a smaller scale showing the gun in position for transport.

The wall of the casing A is provided internally with two sockets a into which are engaged the shafts or trails H for the battery position (Figs. 1 to 3).

This engagement is made in the desired position in such a manner that the rear portions of the trails diverge from each other. The trails are provided in the usual manner with shoes h¹ for the purpose of being anchored by means of stakes h² for instance. The shoes may be connected together by a stay I.

The movement of the gun mount D in the guiding saddles C, C¹, can be effected by means of any suitable actuating mechanism. For the purpose of altering the elevation of the gun, the gun barrel can be pivoted in the gun mount D by means of suitable gearing.

For transport, the gun barrel and its accessories are fixed on the gun mount D by the elevating mechanism, and on the saddles C, C¹ by the training mechanism. Since the gun barrel is of reduced length, the ends B, B¹ can be turned down and locked in that position upon the casing A after the shafts H have previously been disengaged from the sockets a and engaged in the sockets g, g¹ of the collars G, G¹.

In the case where the gun barrel has a length such that it is impossible to lodge the whole of the chase inside the casing A, one of the ends B, instead of being solid, may be suitably apertured to allow of the passage of the muzzle end of the gun barrel.

Figure 5:
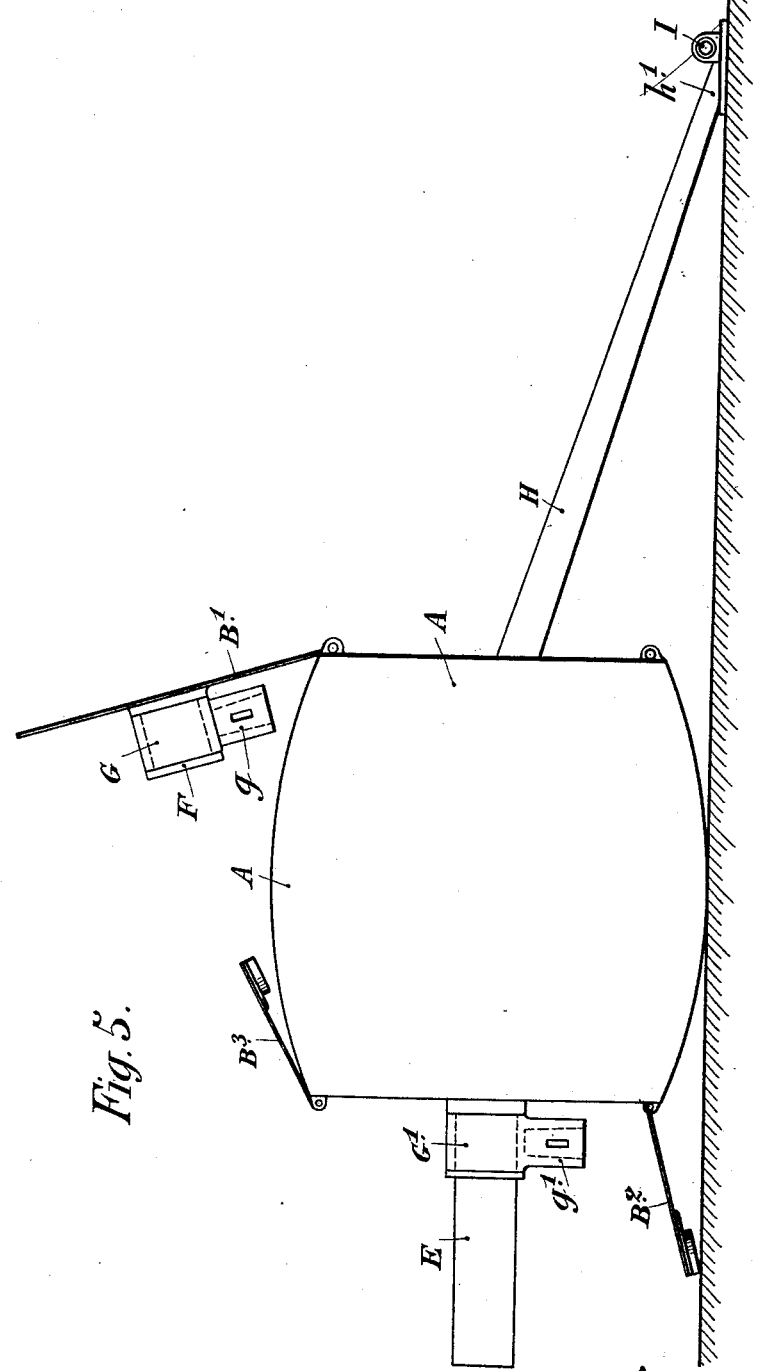
Figs. 5, 6 and 7 illustrate a second constructional form in which—
Figure 6:
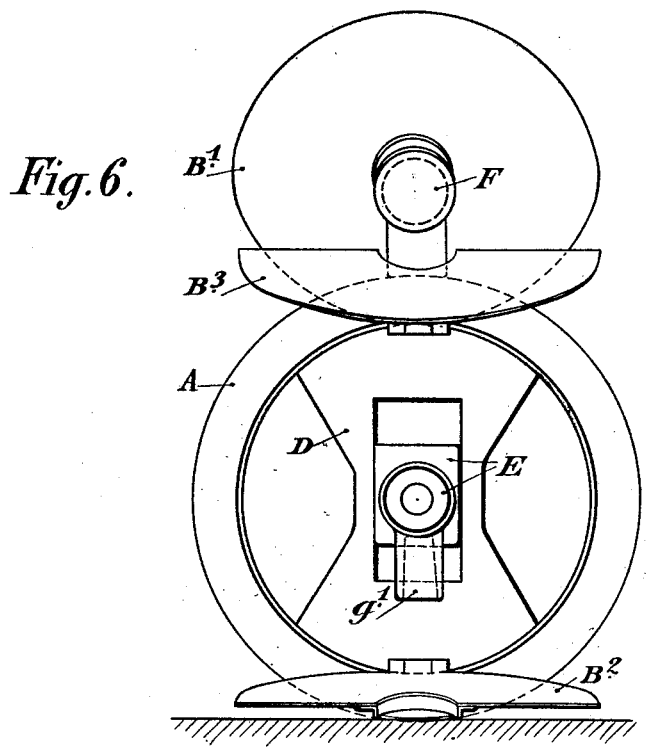
Figure 7:
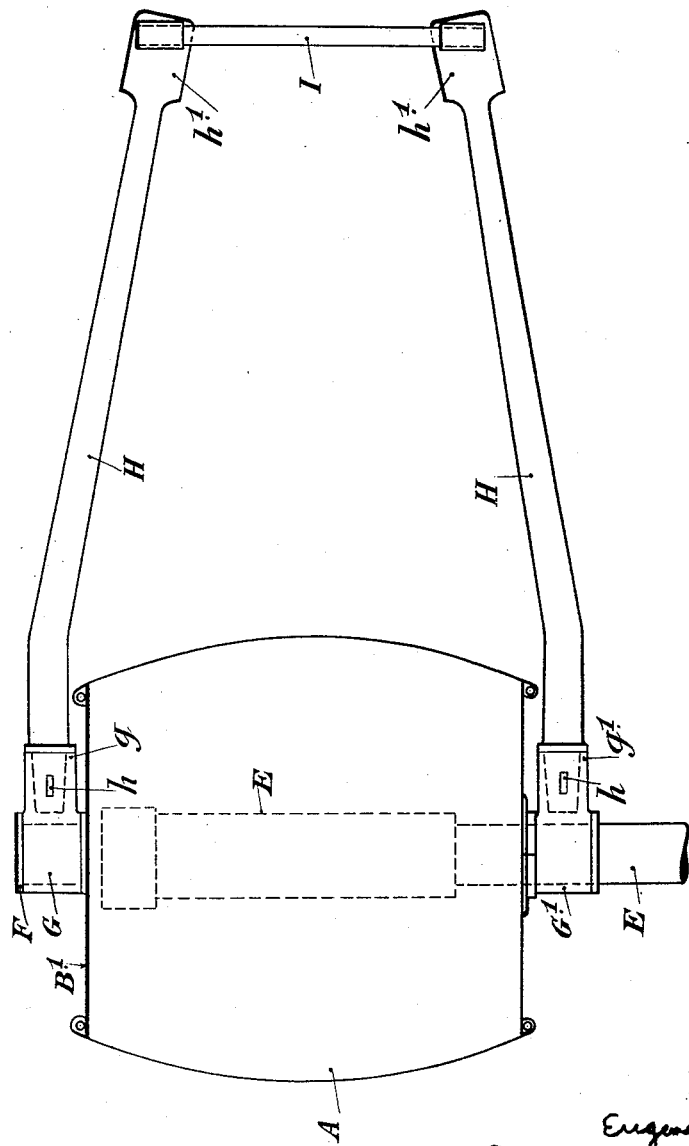

In the constructional form shown in Figs. 5, 6 and 7, one of the ends B is divided into two parts B², B³, capable of folding respectively upwardly and downwardly for placing the gun in battery position, or folding against the wall of the casing A for transport; the whole end B², B³ having then only an aperture sufficient for the passage of the chase of the gun barrel.

The shaft-like trails H can then be engaged for transport in trunnions carried by the ends B¹ and B²—B³ respectively; but in order to avoid having to arrange these trunnions below or above the longitudinal axis of the gun, it is preferred to provide only one end trunnion F in the axis of the end B¹, carrying as in the preceding example a collar G and a socket g.

The engagement of the other shaft is effected in a collar G¹ arranged around the chase of the gun and provided with its socket g¹.

In other respects the gun is constructed exactly as in the preceding example.

Figure 8:
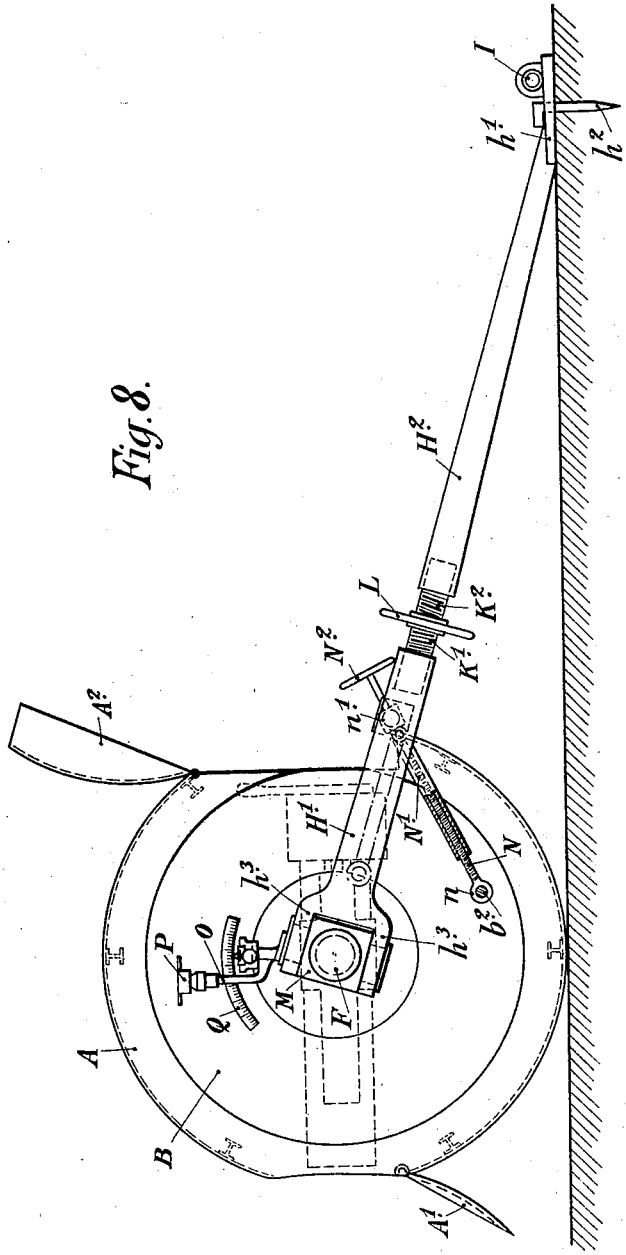
Figs. 8, 9 and 10 illustrate a third constructional form of the invention in which—
Figure 9:
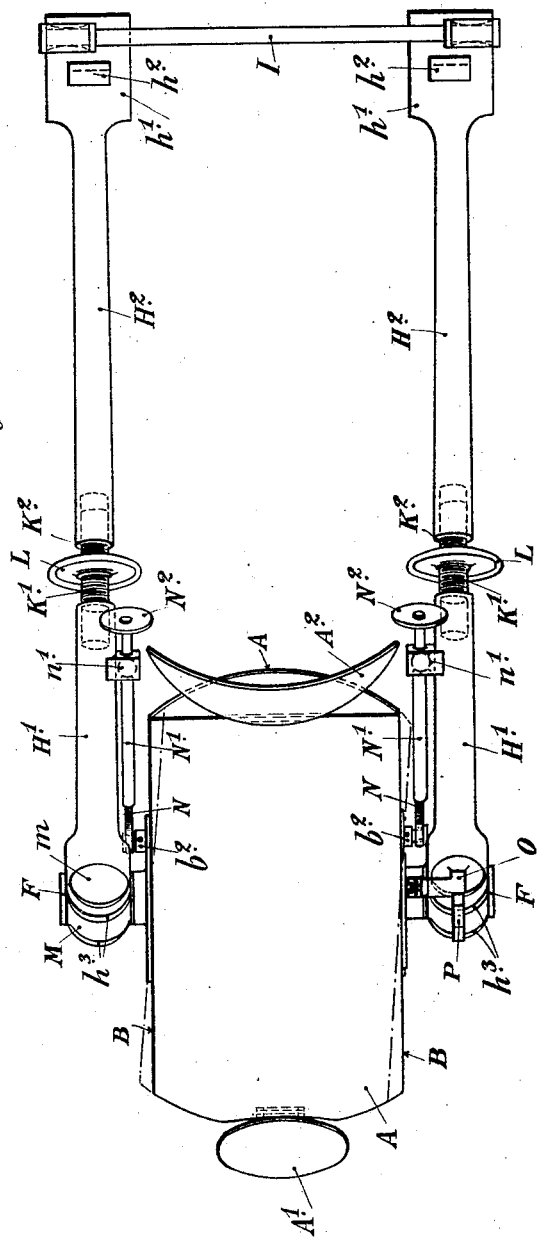
Figure 10:
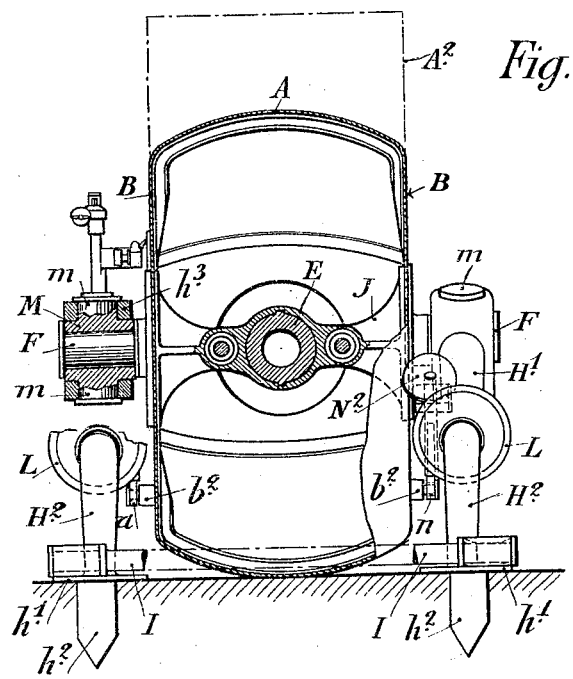

As shown in Figs. 8, 9 and 10 the gun barrel is supported by a cross piece J which serves to stay the two ends B of the barrel-shaped casing; in other words the gun barrel is fixed absolutely in relation to the barrel-shaped gun carriage A.

The training and elevating of the gun are effected in this case by shifting the casing A and the gun barrel fixed to it, together as a whole. For this purpose the shaft-like trails are of peculiar construction; they are divided each into two elements H¹ H² connected together by a sort of stretcher which allows of shortening or lengthening the combination H¹ H² within certain limits. This stretcher consists of a rod formed with two opposite screw threads K¹, K², a hand wheel L being fixed on the middle of the said rod. Screw threads are tapped in the ends opposite the sections H¹ H² for the screw K¹ and screw K² respectively.

The forward end of the section H¹ of the shaft-like trails is pivoted by means of a Cardan joint on the trunnion F of the corresponding end B. A sleeve M movable around the said trunnion F, is for this purpose provided with two small trunnions m around which there are adapted to turn forks h³ carried by the heads of the sections H¹. It will be readily perceived that when the shaft-like trails are anchored with their rear ends in the ground, the corresponding trail can be shortened or lengthened by suitably operating the hand wheel L. If the right hand trail is lengthened while the left hand trail is shortened or not shortened, the barrel-shaped casing will be caused to turn to the left around its vertical symmetry axis. Vice versa, if the left-hand trail be lengthened, while at the same moment the right hand trail is shortened or not, then the casing will be caused to turn to the right.

The casing A is fixed to the trails by tie-rods which, while allowing the casing A to turn around its vertical axis for training the gun, are however so constructed as to constitute a mechanism which will allow the said casing to turn around its horizontal axis for the purpose of elevating the gun.

Each tie-rod is formed of two sections N, N¹ screwing one on the other. The section N which consists for example of a screw threaded rod, is hinged at its free end $n$ on a pin $b^2$ projecting from the corresponding end B. The section N¹ screwing on the section N is hinged by means of a ball and socket joint $n^1$ in a boss carried by the trail section H¹. This section N¹ carries a hand wheel N². By operating the hand wheels N² simultaneously and in the same direction, the combination N. N¹ will be shortened or lengthened according to that direction, and consequently the casing will be caused to rotate around its axis so as to produce a lowering or an elevation of the gun chase.

The casing A which is continuous during the rolling of the gun during transport, comprises elements capable of being turned down or turned up for firing, for instance a front element A¹ adapted to be turned down in front of the muzzle of the gun when the gun is in battery position, and a rear element A² adapted to be turned up opposite the breech so as to allow of charging the gun and if necessary also of a certain amount of recoil of the gun barrel.

As shown in this constructional form, the shaft-like trails remain always pivotally connected to the trunnions carried by the end B.

As shown more particularly in Figs. 8 and 10, one of the trunnions $m$ may have fixed to it a bracket O for a sighting apparatus P and the corresponding end B may be marked with an arc-shaped scale Q having its center on the axis of the trunnions F. For transport, the ends of the screw threaded rods N may be disengaged from the corresponding pivot pin $b^2$ and hooked on to the trail section H¹ as indicated in dot and dash lines in Fig. 8.

Figure 11:
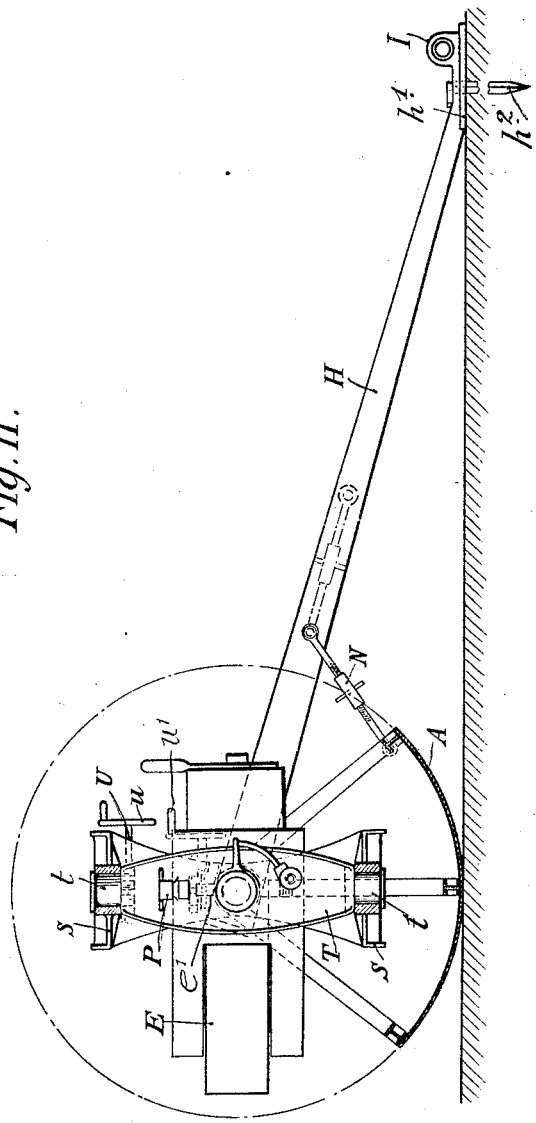
Figure 12:
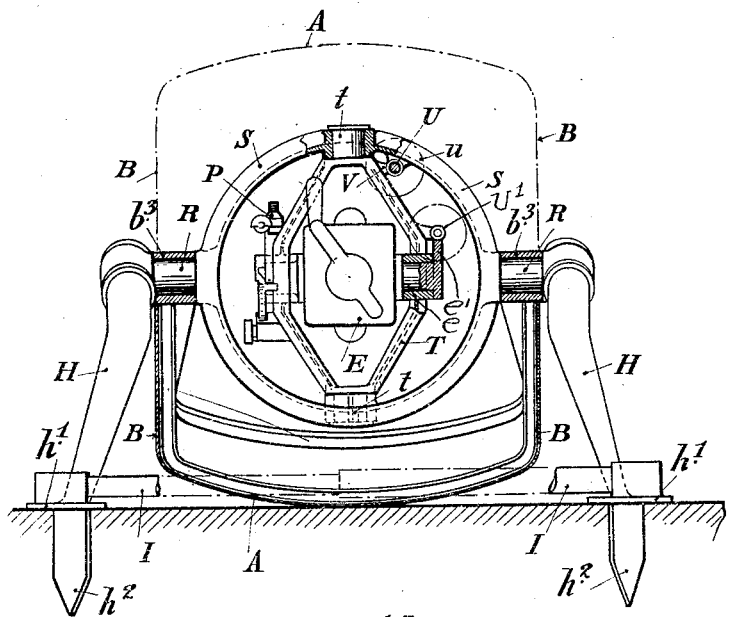

As shown in Figs. 11, 12 and 13, the ends B of the barrel-shaped casing are formed with bearings $b^3$ for trunnions R to which are fixed or pivoted externally the heads of the shaft-like trails H. These trunnions R serve as supports for or are fixed to, a ring S. In this ring, a gun mount T may be pivoted by means of trunnions $t$ arranged along a diameter of the ring at right angles to the axis of the trunnions R.

The gun barrel E is journaled in the gun mount T. The gun is trained by pivotal movement of the gun mount T in the ring S, produced for instance by a mechanism of which one part, namely the screw U provided with a hand wheel $u$ and carried by the ring S, actuates a corresponding part such as the toothed sector V carried by the gun mount T.

The gun is elevated by any suitable known means comprising an element fixed to the gun barrel, and an element fixed to the gun mount T. As shown in Figs. 11 and 12, a screw-shaft U′ is journaled in a bracket on the gun mount T and is provided with a hand-wheel $u'$ for rotating the same. This screw-shaft engages a segmental gear $e'$ fixed concentrically on the trunnion $e$ of the gun. By operating this mechanism, the elevation of the gun can be varied. A variable part of the casing A may be made removable or disappearing for the purpose of firing.

As in the preceding example, for firing the gun, the casing A may be fixed to the trails by means of tie-rods M. During transport, the push or pull exerted upon the shafts will produce a rotation of the casing A and the bearings $b^3$ fixed thereto around the trunnions R that are fixed to both the ring S and the said shafts.

Figure 14:
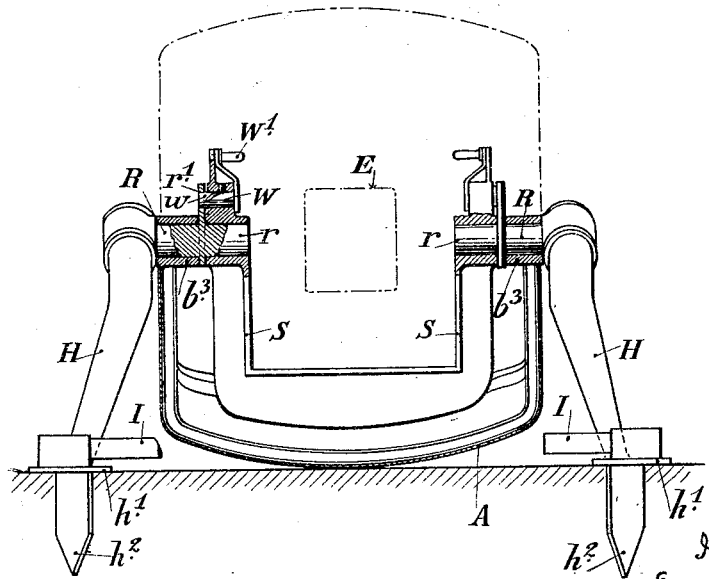
Fig. 14 is a view partly in end elevation and partly in section showing a fifth constructional form of the invention.
Figure 16:
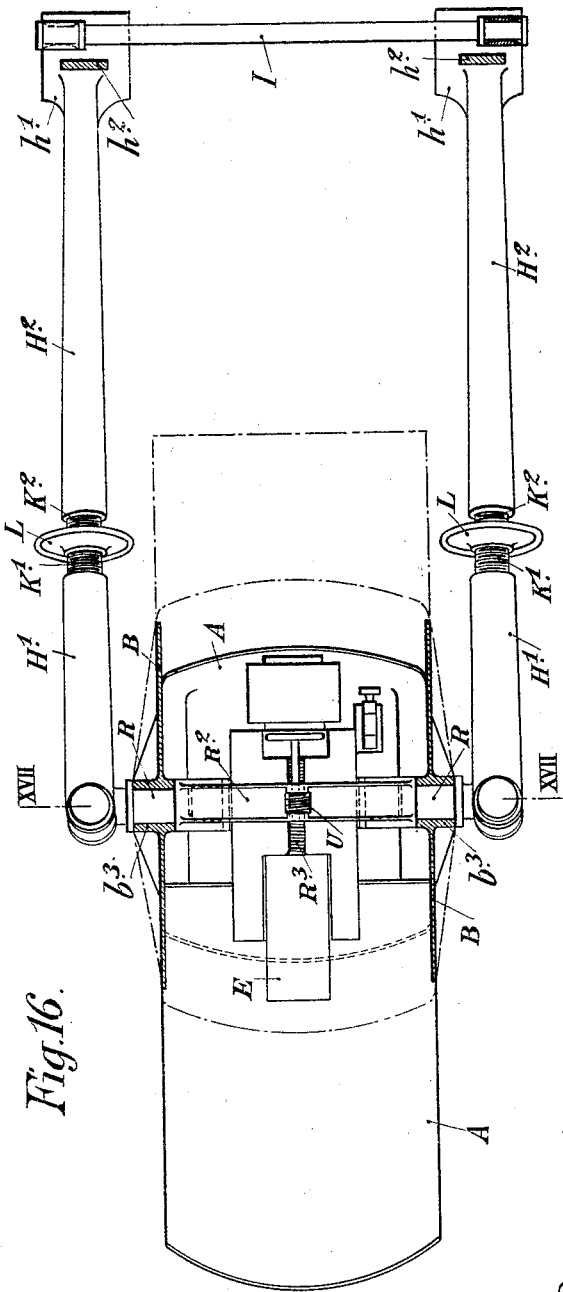
Figure 17:
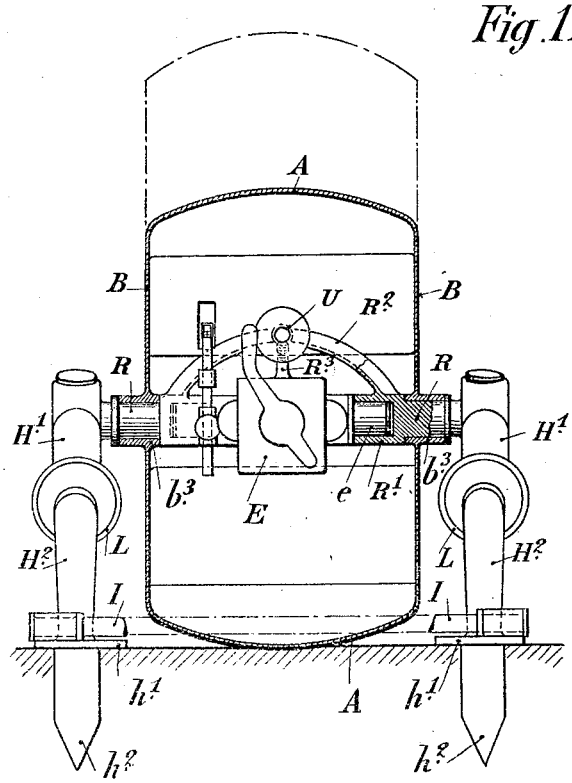

Fig. 14 illustrates a modification of the constructional form which is hereinbefore described. In this modification the complete ring S is replaced by a cradle or half ring. The trunnions R, instead of being fixed to the half ring S, have internal extensions $r$ serving as pivots for the cradle.

For firing, the cradle S may be fixed on the trunnions R by means of rotary bolts W which may be engaged in sockets $r^1$ formed in projections of the trunnions R, $r$.

Each of these bolts W has for this purpose a helical groove $w$ in which is engaged a stud fixed to the cradle S.

The rotation of the bolt W by means of the handle W¹ causes the bolt to move out of the way and out of the socket $r^1$.

The bolts are moved out of the way for transport, thereby avoiding the necessity of inclining the cradle and gun barrel together as a whole.

In the constructional form shown in Figs. 15 to 18, as in the two preceding examples, the barrel-shaped casing A of which one part can be moved out of the way for firing (Fig. 15), is so arranged as to turn during transport around the trunnions R that are fixed to the shaft-like trails H. The characteristic feature of this modification is that the trunnions R are prolonged internally in such a manner as to form bearings R¹ for the trunnions $e$ of the gun barrel E. These bearings are connected by a bridge R² which carries a part (the screw U), of the elevating mechanism, with which there meshes a toothed member such as the sector R³ carried by the gun barrel.

In this modification the training of the gun can be effected by means of a system of shaft-like trails composed of two sections H¹ H² connected together by a stretcher K¹, K² as described in the constructional form shown in Figs. 8 to 10.

The elements H¹ of the trails are hinged to the trunnions R by means of a Cardan joint shown in vertical section in Fig. 18.

What I claim is:

1. In a gun mount, the combination of a barrel-shaped gun casing adapted to roll over the ground, trunnion bearings supported in axial alinement of said casing, trails adapted to engage said bearings to serve as shafts for traveling and to serve as anchoring trails for firing.

2. In a gun mount, the combination of a barrel-shaped gun casing adapted to roll over the ground, trunnion bearings supported in axial alinement of said casing, trails adapted to engage said trunnions to serve as shafts for traveling and to serve as anchoring trails for firing and means for training and elevating said gun.

3. In a gun mount, the combination of a barrel-shaped gun casing adapted to roll over the ground, end closures for said casing provided with trunnion bearings and trails adapted to engage said bearings to serve as shafts for traveling and to serve as anchoring trails for firing.

4. In a gun mount, the combination of a barrel-shaped gun casing adapted to roll over the ground, a gun mounted to move therein in zenithal and azimuthal planes, end closures for said casing provided with trunnion bearings and trails adapted to engage said bearings to serve as shafts for traveling and to serve as anchoring trails for firing.

5. In a gun mount, the combination of a barrel-shaped gun casing adapted to roll over the ground, end doors for said casing provided with trunnion bearings, trails adapted to engage said bearings to serve as shafts for traveling and to serve as anchoring trails for firing, oppositely disposed platforms mounted in said casing having circular guides, and oppositely disposed stay plates having bearings for receiving a gun and adapted to move in said guides for training.

6. In a gun mount, the combination of a barrel-shaped gun casing adapted to roll over the ground, end doors for said casing provided with trunnions, collars revoluble on said trunnions provided with sockets, trails adapted to engage said sockets to serve as shafts for traveling and to serve as anchoring trails for firing.

7. In a gun mount, the combination of a barrel-shaped gun casing adapted to roll over the ground, end closures for said casing provided with trunnion bearings, trails adapted to engage said bearings for traveling and sockets within said casing for receiving the ends of said trails for anchoring when firing.

8. In a gun mount, the combination of a barrel-shaped gun casing adapted to roll over the ground, a gun supported therein, trunnion bearings supported in axial alinement of said casing, trails adapted to engage said bearings to serve as shafts for traveling and to serve as anchoring trails for firing, and means for imparting relative movement between said casing and gun for training the latter.

In testimony whereof I have signed this specification.

EUGÈNE SCHNEIDER.

Witnesses:
CHAS. P. PRESSLY,
ANDRÉ MOSTICKER.